United States Patent

Andrews et al.

[19]

[11] Patent Number: 5,930,067
[45] Date of Patent: Jul. 27, 1999

[54] MULTI-HARMONIC COMPENSATOR FOR TRACK FOLLOWING IN DISK DRIVES

[75] Inventors: Thomas L. Andrews, Ward; Robert A. Alt; Steven J. Mertens, both of Longmont; Gary E. Counts, Arvada; Ronald J. Loomis, Littleton, all of Colo.

[73] Assignee: Mobile Storage Technology, Inc., Boulder, Colo.

[21] Appl. No.: 08/903,405

[22] Filed: Jul. 29, 1997

[51] Int. Cl.$^6$ .................................................. G11B 5/596
[52] U.S. Cl. ................................. 360/77.04; 360/77.07
[58] Field of Search .................................. 360/25, 27, 75, 360/77.01, 77.02, 77.04, 77.05, 77.06, 77.07, 77.11; 369/44.32, 44.34

[56] References Cited

U.S. PATENT DOCUMENTS

| | | | |
|---|---|---|---|
| 4,831,315 | 5/1989 | Hammond et al. ................. | 360/75 X |
| 4,974,109 | 11/1990 | Hoshimi et al. ................... | 360/77.11 |
| 5,539,714 | 7/1996 | Andrews, Jr. et al. ............. | 369/44.26 |

*Primary Examiner*—Paul W. Huber
*Attorney, Agent, or Firm*—Skjerven, Morrill, MacPherson, Franklin & Friel LLP

[57] ABSTRACT

An adaptive servo system for a disk drive compensates for a track being off center or distorted by analyzing the spectral content of the radial variation of the centerline of a track relative to a rotation axis, generating multiple component signals having frequencies that are harmonics of the rotation frequency, and combining the component signals in a positioning signal for an actuator. Analyzing the spectral content of the radial variation can be accomplished by a discrete Fourier transform of a position error signal while generating a correction signal that cancels all or part of previously determined components of the position error signal. The system converges to generating a periodic signal that compensates for multiple harmonics in the radial variation in the position of the track.

17 Claims, 6 Drawing Sheets

MULTI-HARMONIC COMPENSATOR FOR TRACK FOLLOWING IN DISK DRIVES

BACKGROUND

1. Field of the Invention

This invention relates disk drives and to systems and methods for following a track that may be distorted and/or offset from a rotation axis of a disk.

2. Description of Related Art

Figure 1:
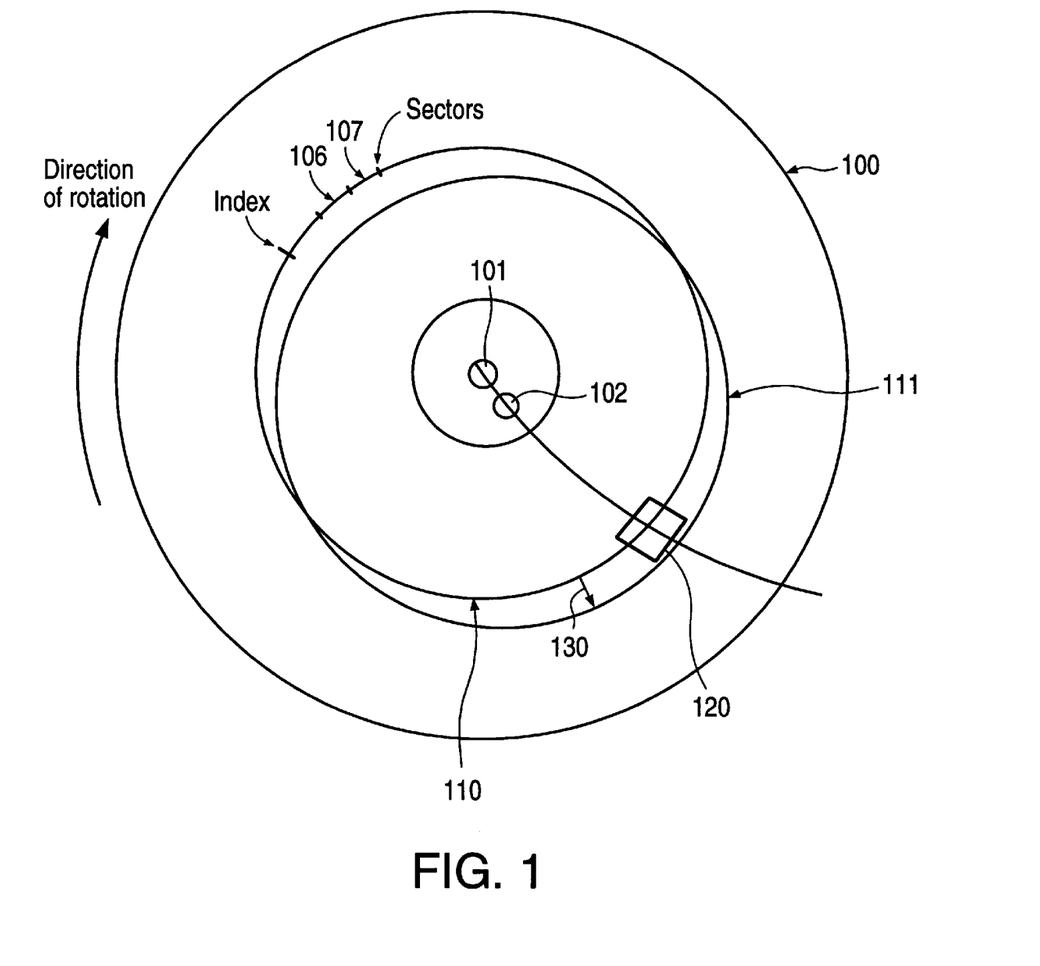
FIG. 1 illustrates disk runout when the center of a disk and a track on the disk is displaced relative to a rotation axis.

A conventional hard disk contains one or more disks for data storage and one data head per disk surface for writing and reading data on the surface. In operation, each data head flies above an associated disk surface as the disk rotates and in response to signals from disk drive electronics, reads or writes data in a magnetic medium on the associated surface. FIG. 1 illustrates a typical disk configuration where a data head 120 writes and reads data in concentric circular tracks such as track 110 on disk 100.

Typically, spokelike servo wedges partition each track into data frames such as data frames 106 and 107, where each data frame contains all or part of one or more data sector. Each servo wedge contains one servo sector per track, and the servo sectors contain information identifying a track and a data frame associated with the servo sector. The data head reads information from the servo sectors so that the disk electronics can determine the radial and circumferential position of the data head relative to the disk surface.

A servo system uses the information from the servo wedges when positioning the data head. For example, during an operation often referred to as a seek, the servo system moves the data head radially to a track containing data sector to be accessed. Once on the track, the servo system keeps the data head following the track circumferentially until the desired data sector passes under the data head. If a track is perfectly circular and centered on the disk's rotation axis, no radial movement of the data head is required to keep the data head following the track. However, tracks can be off-center or not circular.

In typical disk drives, clamps are used to mount the disks on a spindle for rotation. Such clamps apply pressure to the disks to hold the disks in place. The clamping pressure may be high enough to prevent starting torque or operational shock and vibrations from displacing the disk relative to the spindle, but high clamping pressure can distort the disks. Accordingly, some disk slippage is acceptable to reduce distortion if the slippage is less than a maximum offset that the servo system tolerates for track following.

FIG. 1 illustrates a track, initially in position 110 and centered on a rotation axis 101, that moves a displacement 130 to a position 111 centered at a point 102 when disk 100 slips. Displacement 130 is referred to herein as the runout. To follow the track as disk 100 spins, the servo system must move data head 120 in and out radially to compensate for the runout when the track is in position 111. U.S. Pat. No. 5,539,714, entitled "Adaptive Runout Compensation for Miniature Disk Drives" describes a disk system that compensates for runout such as illustrated in FIG. 1 and is incorporated by reference herein in its entirety. In U.S. Pat. No. 5,539,714, a disk drive's servo system includes a servo compensator and a secondary servo compensator that generate position signals for positioning a data head over a track. The servo compensator generates a position signal from a position error signal determined for last servo wedge. The secondary servo compensator analyzes the position error signal from previous revolutions of the disk and generates a sinusoidal position signal having a frequency matching the rotation frequency of the disk. The sinusoidal position signal partially compensates for the repetitive variations caused by runout in radial position of the track and has an angular frequency equal to that of the disk's rotation and a phase and magnitude determined from the analysis of the position error signal.

Difficulties in track following can arise for the above-described servo systems if a track is distorted so that the repetitive variation in track radius are not well approximated by a sinusoidal signal having the rotation frequency. In such cases, the secondary servo compensator described above provides an incomplete compensation for repetitive variations, and the servo compensator must provide a larger component of the actuator positioning signal. The servo compensator may not have a sufficient dynamic range to handle the track distortion. An improved servo system is sought that better compensates for periodic variations in track radius caused by both runout and track distortion.

SUMMARY

In accordance with an aspect of the invention, a multi-harmonic compensator in a servo system analyzes the radial variation of a track as indicated by a position error signal and determines the spectral content of the radial variations. Coefficients for selected terms in an expansion (e.g., a Fourier expansion) of radial variation are extracted and used in the generation of two or more periodic signals. The periodic signals may include a sinusoidal signal having a frequency equal to the fundamental (or first) harmonic of the rotation frequency and a sinusoidal signal having a frequency equal to the second harmonic of (i.e., twice) the rotation frequency. The periodic signals are combined to form a position correction signal which provides a close match for radial variations of a typical track distortion.

An exemplary embodiment of the invention provides a method for keeping a data head aligned with a track on a disk while the disk rotates about a rotation axis. The method includes: analyzing the spectral content of the radial variation of the track to determine components in an expansion of the radial variation; generating periodic signals, where each periodic signal has a magnitude equal to the determined magnitude for an associated one of the components; and generating from the periodic signals a positioning signal for to control an actuator. The positioning signal causes the data head to follow a path represented by a combination of selected (i.e. most significant) harmonics of the radial variation. Analyzing the radial position of the track can be performed by a Fourier analysis of a position error signal and changing the positioning signal to eliminate selected harmonics from the position error signal.

Another embodiment of the invention is a servo system that includes: an actuator; an analyzer that determines the harmonic content of the radial variation in a track's position; a set of compensation generators, each of which generates a periodic signal having a different frequency; and a gain adjustment unit that combines the periodic signals to generate a position signal for the actuator. The analyzer and the compensation generators change the magnitudes of the periodic signals until the selected harmonics are substantially eliminated from the position error signal.

DETAILED DESCRIPTION

Figure 2:
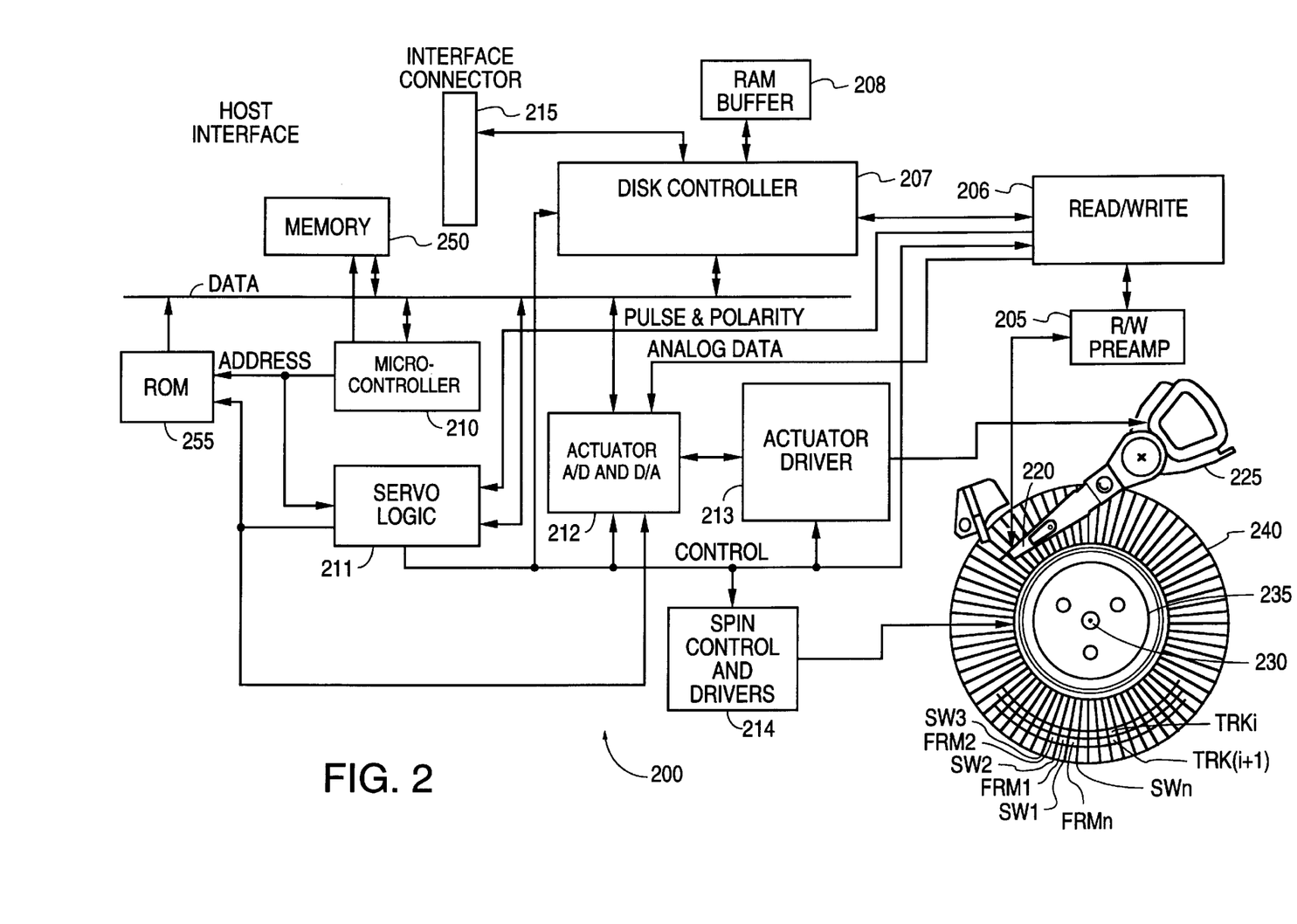
FIG. 2 illustrates a disk drive implementing an adaptive compensation system in accordance with an embodiment of the invention.

According to an aspect of the invention, a disk drive 200 illustrated in FIG. 2 uses a novel servo compensation system to compensate for periodic radial variation caused by runout and distortion of tracks. Disk drive 200 contains one or more circular planar disks 240 where each disk is coated on at least one side with a magnetic medium. A data head 220 records data in concentric tracks, e.g. tracks TRKi and TRK(i+1), in the magnetic medium. Corresponding tracks on other disk surfaces (not shown) are approximately cylindrically aligned with the tracks on the disk surface shown. Embedded servo wedges SW1 to SWn on the disk surface divide each track into multiple data frames FRM1 to FRMn, and each data frame FRM1 to FRMn contains all or part of one or more data sectors. For constant density recording, the number of data sectors per data frame in a particular track depends on the radius of the track. Typically, tracks of similar radii are grouped into a zone having the same track format, e.g. the same amounts of data in corresponding data frames. Each servo wedge SWj where j=1 to n, includes m servo sectors, where m is the number of concentric circular data tracks on disk, so that each disk surface contains a total of n·m servo sectors.

In a manner known to those skilled in the art, disk drive 200 connects through an interface connection 215 to a computer system (not shown), and a disk controller 207 controls transfer of data between the computer system and a data buffer 208 and between data buffer 208 and disk 240 via a read/write circuit 206, a preamplifier 205, and data head 220. Disk controller 207 also processes read/write requests in conjunction with a servo system for positioning data head 220. In disk drive 200, the servo system includes a microcontroller 210, servo demodulation and glue logic 211, an actuator A/D and D/A circuit 212, and actuator driver circuit 213 and uses preamplifier 205 and read/write circuit 206 to read information from servo wedges SW1 to SWn when radially or circumferentially positioning data head 220. Methods for encoding and decoding position information in servo sectors are well known in the art, and the particular method selected is not critical to the invention.

Microcontroller 210 controls the servo system by executing firmware from a non-volatile memory 255 containing seek control, proportional integral difference (PID) servo compensation, and harmonic compensation procedures. In an exemplary embodiment of the invention, non-volatile memory 255 is a ROM but other non-volatile memory such as a PROM, EPROM, EEPROM, or Flash memory may be used. Microcontroller 210 also accesses a volatile memory 250 for storing and retrieving program variables and instructions. In the exemplary embodiment microcontroller 210 is a 46100(HPC+) microprocessor available from National Semiconductor of Santa Clara, Calif., but alternatively any microcontroller or microprocessor of sufficient power could be used.

Microcontroller 210 executes a servo compensator that receives a digital position error signal derived from reading a servo sector. The servo compensator determines the position correction needed to position data head 220 over the centerline of the track being followed. In the exemplary embodiment, the position error signal provides a series of values where each value indicates a radial offset between data head 220 and a track's centerline when data head 220 crosses a servo sector associated with the value. The servo compensator generates a servo compensation signal for that servo sector, and a digital position signal derived from the servo compensation signal is sent to a digital-to-analog converter in actuator circuit 212. Actuator circuit 212 and an actuator driver 213 process the digital position signal and apply an analog signal to an actuator 225 in a conventional fashion to move data head 220 toward the centerline of the track. This process is sequentially repeated for each servo sector.

A clamp 235 clamps disk 240 to a spindle of a drive motor. In the exemplary embodiment of the invention, disk 240 is one of multiple 2.5-inch diameter glass disks which clamp 235 and spacers (not shown) hold in place relative to a rotation axis 230, and clamp 235 is made of rolled 300 series stainless steel that is relatively thin (about 0.5 mm thick). Rolling of the metal in clamp 235 is believed to create a grain that causes clamp 235 to apply anisotropic force (clamping pressure) to disk 240. During assembly, initial application of the clamping pressure from clamp 235 distorts disk 240 like a potato chip or saddle, but the clamping pressure is selected so that the vertical distortion (i.e. warping out of the plain of disk 240) is minimal. Differences in stress in the plain of disk 240 still distort the shape of disk 240. After the initial clamping, servo sectors are written in servo wedges SW1 to SWn on disk 240 to define circular tracks TRK1 to TRKm. Subsequent shocks and/or thermal cycling of disk 240 may cause disk 240 to slip which can offset disk 240 relative to rotation axis 230 and/or relieve some of the in-plane stress from clamp 235 which changes the shape of disk 240 and tracks TRK1 to TRKm.

Figure 3A:
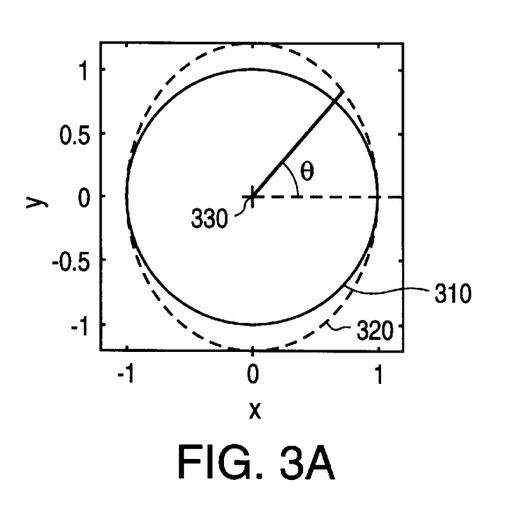
FIGS. 3A and 4A illustrate tracks distorted into ellipses without and with an offset from a rotation axis.
Figure 3B:
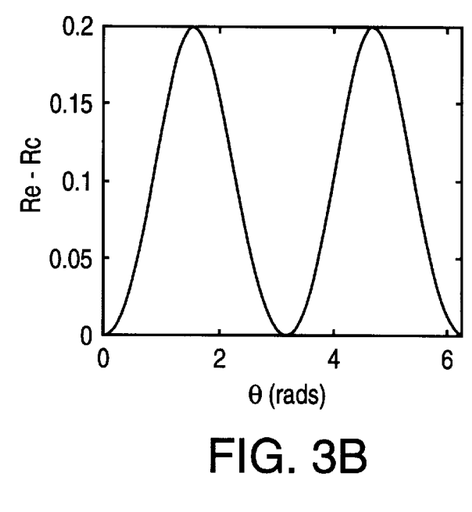
FIGS. 3B and 4B are plots of radial variations in the tracks of FIGS. 3A and 4A, respectively.

FIGS. 3A and 4A illustrate two types of deformation of a circular track 310 of unit radius. In FIG. 3A, circular track 310 is distorted into an elliptical track 320 having a semi-major axis of 1.2 units and a semiminor axis of 1 unit. Both tracks 310 and 320 are centered about a rotation axis 330. For each revolution of track 320 about rotation axis 330, a data head must be moved from a radius of 1 unit out 0.2 units to a radius of 1.2 units in a first quarter revolution, moved back 0.2 units to radius 1 unit in a second quarter revolution, moved back out to a radius of 1.2 units in a third quarter of a revolution, and finally back to a radius of 1 unit after a full revolution. FIG. 3B illustrates the radial variation δR of track 320 for a complete revolution of track 320. Radial variation δR is equal to the difference between the radius Re of distorted track 320 and the radius Rc of circular track 310.

A constant (DC) actuator position signal would maintain data head 220 at a fixed radius, for example, at a radius of 1.1 unit, and would not accurately follow track 320. A servo compensator which varies the actuator position signal according to the last detected position error between data head 220 and the center of the track may be accurate at that servo sector but does not anticipate further between-servo-sector position error that results for an off-center or distorted track. Thus, using a conventional servo compensator may not provide accurate track following.

Figure 3C:
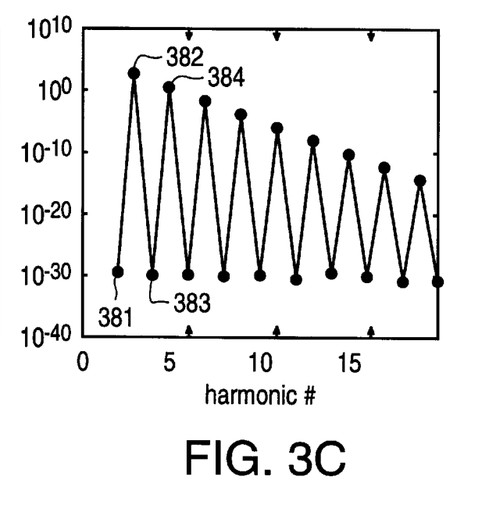
FIGS. 3C and 4C show the magnitudes of spectral components from a discrete Fourier expansions of the plots of FIGS. 3B and 4B, respectively.

The secondary compensator disclosed in U.S. Pat. No. 5,539,714 improves track following capabilities by generating a periodic signal having a frequency equal the frequency of rotation. In generating the periodic signal, the secondary compensator determines a magnitude and a phase that best compensate for the periodic variations in the track radius of the track being followed. This determination effectively calculates the coefficient of the fundamental (or first harmonic) term in a discrete Fourier expansion of the radial variation of the track. For runout compensation of a circular track, the first harmonic is the dominant term of the Fourier expansion since runout requires that the data head be moved outward only once per revolution. Thus, the secondary compensator anticipates the position error correction required for circular tracks that are not centered on the rotation axis. However, as illustrated in FIG. 3C, for a distortion along a preferred axis, the coefficient 382 for second harmonic term in the Fourier expansion of the radius variation of FIG. 3B dominates the first harmonic coefficient 381. (In FIG. 3C, terms for odd harmonics, i.e. the first, third, fifth, . . . harmonics, differ from zero only as a result of errors in numerical approximations used in calculating Fourier transform coefficients.) Thus, a sinusoidal signal at the rotation frequency of the disk does not accurately compensate for periodic variations in the track's radius.

Figure 4A:
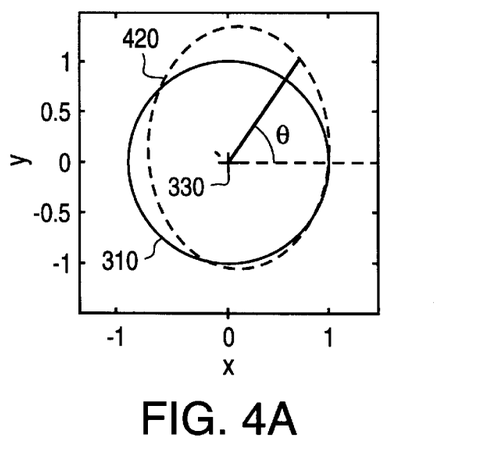
Figure 4B:
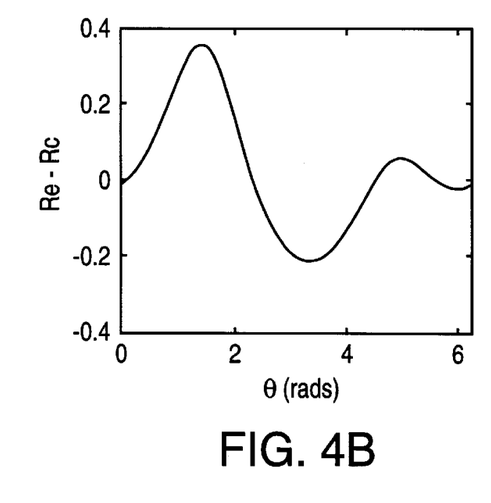
Figure 4C:
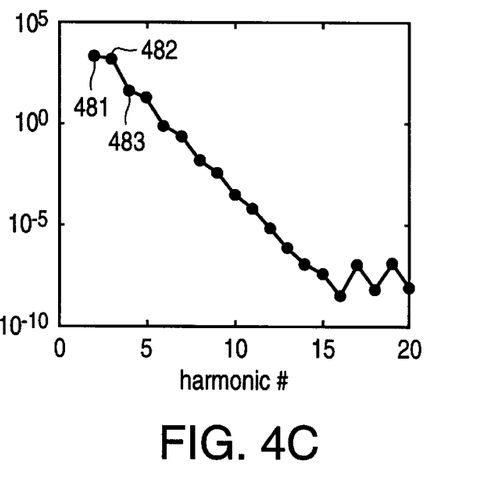

FIG. 4A shows an elliptical track 420 having a semimajor axis of 1.2 units and a semiminor axis of 0.9 units and an offset of 0.1 units along the semiminor axis (x-axis) and 0.15 units along the semimajor axis (y-axis) from a rotation axis 330. For each revolution of track 420 about rotation axis 330, a data head must be moved out about 0.35 units from a radius of 1 out to a radius of 1.35, in about 0.55 units to radius of about 0.8 units, back out to a radius of about 1.05 units, and finally back in to a radius of 1 unit. FIG. 4B illustrates the radial variation δR of elliptical track 420 for a complete revolution. FIG. 4C shows the relative magnitudes of harmonics in a discrete Fourier expansion of radial variation δR of FIG. 4B. For track 420, both the coefficient 481 for the first harmonic and the coefficient 482 for the second harmonic are significant. Coefficients 483 and 484 for the third and fourth harmonics are orders of magnitude smaller than coefficients 481 and 482.

The actual distortion and slippage of a disk or a track on a disk depends on the applied clamping force and type of clamp employed. In the exemplary embodiment of the invention shown in FIG. 2, a 67-lbs (or 33.5-lbs/side) clamping force provides a maximal radial force of about 5 lbs to disk 240. At the inner diameter, a narrowly distributed load causes localized or irregular track distortion that creates more harmonics than would a circular or elliptical track. The elasticity of the disk smoothes distortion in the outer diameter tracks making them more elliptical. Thus, track distortion varies across the disk surface. In the exemplary embodiment of the invention, at 6000 tracks per inch, the clamping is predicted to cause track variations of the order of 7% to 14% of the track pitch with the most significant deformations being at the inner most tracks. After compensating for the first harmonic of the track variation, up to 6.5% residual tracking error can remain.

Figure 5:
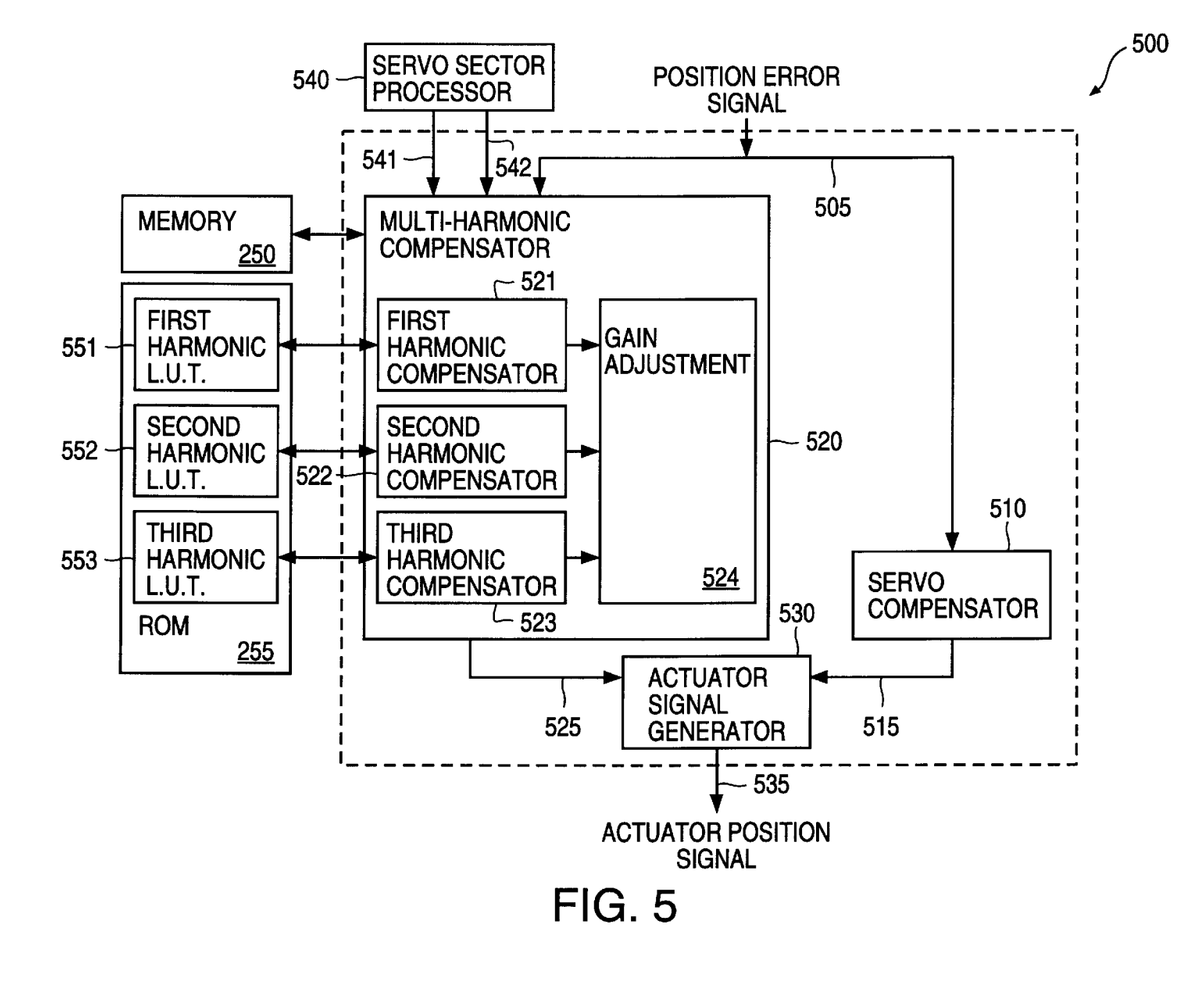
FIG. 5 is a block diagram of the adaptive compensation system in accordance with an embodiment of the invention.

According to an aspect of the invention illustrated in FIG. 5, microcontroller 210 implements a compensator 500 that generates an actuator position signal having a periodic component 525 that contains multiple harmonics of the frequency of rotation to further reduce tracking error. Compensator 500 includes a servo compensator 510 and a multi-harmonic compensator 520 that function independently. Servo compensator 510 compensates for positioning error determined from the last servo sector read. Specifically, servo compensator 510 receives position error signal (PES) 505 and generates actuator position adjustment signal 515 to correct for the radial variation indicated by PES 505. Multi-harmonic compensator 520 monitors the radial variation of the track being followed and generates a periodic signal 525 that anticipates periodic variations as required to minimize the position error signal when following the track. In particular, multi-harmonic compensator 520 receives PES 505, and as described more completely below, analyzes the spectral content of PES 505 while simultaneously generating periodic signal 525 based on the previously determined spectral content and the circumferential position of data head 220. Multi-harmonic compensator 520 provides real-time compensation and anticipates periodic radius variations so that servo compensator 510 mostly corrects for random sources of radius variation.

In the embodiment of FIG. 5, multi-harmonic compensator 520 includes three component compensators 521, 522, and 523 that respectively correspond to the first, second, and third harmonics of the angular frequency of rotation of the disk. Alternative embodiments of the invention may include four or more component compensators to improve the ability of multi-harmonic compensator 520 generate a signal that matches the periodicity in track radius. Alternatively, two component compensators, for example, corresponding to the first and second harmonics of the rotation frequency, may be sufficient because for typical track distortions and offsets, the coefficients for the third and higher harmonics in the Fourier expansion are small.

In the embodiment of FIG. 5, each harmonic compensator 521 to 523 has an associated look-up table 551 to 553 which is stored in ROM 255 and contains sine and cosine values for generation of a component correction signal. Alternatively, microcontroller 210 could generate the sine and cosine function values upon power-up of the disk drive and store the resulting values in tables in memory 250. In the exemplary embodiment, each look-up table contains a sine look-up table and a cosine look-up table that are indexed according to servo sector numbers. In particular, for each index value i=0 to (1−n), where n is the number of servo wedges, the look-up table contains a value associated with the sine function, $\sin(2\pi \cdot h \cdot i/n)$ and the cosine function $\cos(2\pi \cdot h \cdot i/n)$ where h indicates the harmonic associated with the look-up table and is 1, 2, or 3 for table 551, 552, or 553.

Memory storage for look-up tables 551 to 553 can be reduced in a variety of ways. For example, a single table of sine values may be provided instead of separate sine and cosine tables. A sine and cosine values can be accessed from the table using respective indices i and {(i+n/4) MOD n} if the total number n of servo wedges is a multiple of 4. Additionally, a look-up table can be omitted if a table for a lower harmonic contains the required information. For example, table 552 can be omitted and second harmonic compensator 522 can access table 551 using an index (2i MOD n) instead of the index i identifying the current servo sector if the total number n of servo wedges is even. Third harmonic compensator 523 can access table 521 using an index (3i MOD n) if the total number n of servo wedges is a multiple of 3.

Each harmonic compensator 521 to 523 receives a servo sector number 541, a revolution number 542, and position error signal 505 and uses the values from the associated look-up table 551 to 553 to analyze position error signal 505 and to generate a sinusoidal position correction signal. A servo sector processor 540 provides servo sector number 541 indicating the position of data head 220 and a revolution number 542 indicating a count of index pulses for the track. Servo sector number 541 is used to generate indices to look-up tables 551 to 553 in ROM 255.

Harmonic compensators 521 to 523 analyze the radial variation δR of the centerline of a track as determined from PES 505 and/or position signal 535, identify magnitudes and phases of terms in a Fourier expansion of PES 505, and generate sinusoidal signals having magnitudes, phases, and frequencies according to those of the corresponding harmonics. A gain adjustment unit 524 combines the sinusoidal signals from compensators 521 to 523 and adjusts the gain (or magnitude) of the total. The resulting signal, which contains multiple harmonics, matches the periodic variations in track radius better than would a sinusoidal or single component signal.

For each servo sector number i, actuator signal generator 530 combines actuator adjustment signal 515 that servo compensator 510 generates from PES 505 for servo sector i and periodic signal 525 that multi-harmonic compensator 520 generates for the next servo sector i+1 (or i−1 if sector numbers decrease as the disk rotates) to create actuator signal 535 for data frame FRMi. Hence, the periodic compensation is fed forward when microcontroller 210 provides runout compensated actuator adjustment signal 535 to the servo system. Alternatively, actuator signal generator 530 corrects position signal 535 twice per data frame, for signal 515 after each servo sector and for periodic variations at some time before the next servo sector. The servo system uses the information from servo compensator 510 and multi-harmonic compensator 520 to continuously maintain data head 220 over the desired track's centerline.

The position error signal 505 indicates the distance from the data head to the centerline of the track being followed and contains periodic variations such as caused by an offset or distortion of the track and non-repetitive variations for disturbances such as windage, bearing noise, and servo settling transients. Ignoring the non-repetitive variations and assuming that the servo system positioned the data head at the radius R(i−1) of the centerline of the track at the last servo sector i−1, PESi (the position error signal 505 at servo sector i) indicates a difference between the radius Ri of the current track at the current servo sector and the radius R(i−1) at the previous servo sector (i.e. signal PESi=Ri−R(i−1).) It can be shown that the Fourier expansion of the difference Ri−R(i−1) is proportional to the Fourier expansion of Ri and thus may have significant harmonic content in the second and higher order harmonics if track distortion is of the same order of magnitude as track runout. Each harmonic compensator 521 to 523 determines the magnitude and phase of one harmonic in the Fourier expansion of PES 505 and generates a signal to cancel that harmonic. Thus, the correction required from servo compensator 510 is smaller and dominated by non-repetitive effects.

Figure 6:
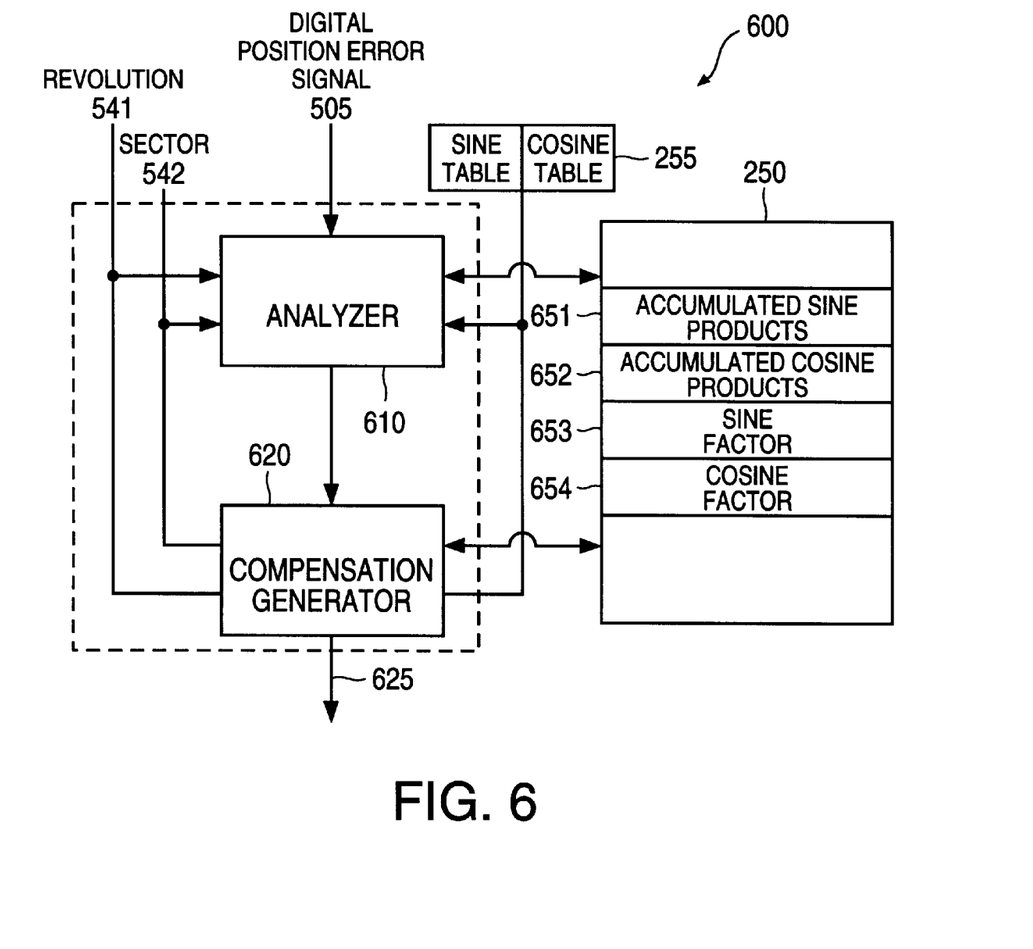
FIG. 6 is a block diagram of a component compensator that analyzes and compensates for a single spectral component of the radial variations of a track.

FIG. 6 is a block diagram of a harmonic compensator 600 such as any one of compensators 521 to 523. Harmonic compensator 600 includes an analyzer 610 and a compensation generator 620. Analyzer 610 sequentially receives a value of position error signal 505 for each servo sector in a track and performs a filtering process that measures a single harmonic in the expansion of PES 505. For example, component compensators 521, 522, and 523 of FIG. 5 measure first, second, and third harmonics that have respective frequencies of one, two, and three times the rotation frequency.

Upon power-up of disk drive 200, storage locations in memory 250 that harmonic compensator 600 uses are cleared, and harmonic compensator 600 is started when the disk reaches a valid spin speed. During a first predetermined number X of analysis revolutions after the valid spin speed is reached, analyzer 610 analyzes PES 505, and compensation generator 620 generates a null signal for correction signal 625. As explained below, compensation generator 620 uses factors 653 and 654 from memory 250 to generate correction signal 625. Since factors 653 and 654 are initially zero, correction signal 625 is also zero.

During the analysis revolutions, analyzer 610 begins a filtering process preferably at an index pulse and analyzes PES 505. In the exemplary embodiment, the filtering process of analyzer 610 is a discrete Fourier transform. For each harmonic, the Fourier analysis requires two sums AccSine and AccCosine that are approximately proportional to integrals required for a Fourier transform. Sums AccSine and AccCosine are respectively a sum of products (sometimes referred to herein as the sine products) and a sum of products (sometimes referred to herein as the cosine products). A sine product $Sine_i$ and a cosine product $Cosine_i$ are given by Equations 1 and 2 respectively.

$Sine_i = PESi \cdot \sin(2\pi \cdot h \cdot i/n)$  Equation 1

$Cosine_i = PESi \cdot \cos(2\pi \cdot h \cdot i/n)$  Equation 2 where h is 1, 2, or 3 to indicate the desired harmonic, index i indicates the servo sector being analyzed, and PESi is the value of PES 505 for servo sector i. The sine and cosine products are evaluated for each servo sector i in the track where the servo sectors are numbered from 0 to (n−1). In the exemplary embodiment, n is 72.

Sums 651 and 652 are respectively the sum of sine products $Sine_i$ and the sum of cosine products $Cosine_i$. Products 651 and 652 are accumulated in memory 250, for each servo sector in a predetermined number X of full revolutions, i.e. each product $Sine_i$ or $Cosine_i$ is added to the sum 651 or 652 already stored in memory 250. The minimum number X of analysis revolutions is one, but to obtain better sampling, a larger number of revolutions is preferred. However, the number should not be so large that an accumulated sum overflows the allotted storage. Thus, the word length used for sums 651 and 652 in memory 250 and the maximum radial variation of a track limit the maximum number X of analysis revolutions. In the exemplary embodiment, the word length is 16 bits and considering the maximum radial displacement and track distortion, four analysis revolutions are selected.

Equations 3 and 4 give the values of sums 551 and 552 in memory 250 after all the servo sectors in X analysis revolutions are processed.

Equation 3:
$$AccSine = \sum_{F=0}^{X-1} \sum_{i=0}^{n-1} Sine_i$$

Equation 4:
$$AccCosine = \sum_{F=0}^{X-1} \sum_{i=0}^{n-1} Cosine_i$$

where i is the number of the servo sector being analyzed; n is the total number of servo sectors per disk revolution; F, the number of the revolution being analyzed, ranges from the set {0, 1, . . . , (X−1)}; and X is the predetermined number of analysis revolutions. The sums are proportional to an approximation of an integral of PES 505 with a sine function and a cosine function respectively and thus indicate the magnitudes of sine and cosine terms in a Fourier expansion of PES 505.

After processing all servo sectors in X analysis revolutions, analyzer 610 forms a sine factor (SineFactor)

653 and a cosine factor (CosineFactor) 654 that are averaged values of respective sums 651 and 652. Specifically, the sine and cosine factors 653 and 654 are:

Equation 5:
$$\text{SineFactor} = GF \cdot \frac{[\text{AccSine}]}{X \cdot n}$$

Equation 6:
$$\text{CosineFactor} = GF \cdot \frac{[\text{AccCosine}]}{X \cdot n}$$

where GF is a gain factor; X is the number of analysis revolutions; and n is the total number of servo sectors per disk revolution.

During the revolution following the analysis revolutions, compensation generator 620 begins generate correction signal 625 based on the determined factors 653 and 654. For each servo sector indicated by servo sector number 541, compensation generator 620 retrieves from ROM 255 the appropriate sine and cosine values for the servo sector and then multiplies the sine value and cosine value by sine factor 653 and cosine factor 654, respectively. Specifically, compensation generator 620 determines:

Sine Compensation$_i$=SineFactor·(Sine Value)$_i$   Equation 7

Cosine Compensation$_i$=CosineFactor·(Cosine Value)$_i$   Equation 8 where (Sine Value)$_i$ and (Cosine Value)$_i$ are values from the look-up tables associated with servo sector i. The two products Sine Compensation$_i$ and Cosine Compensation$_i$ are added to generate signal 625. Compensation generator 620 continues to generate frame-by-frame compensation using factors 653 and 654 from the prior analysis.

In one embodiment, gain adjustment unit 524 (FIG. 5) sums correction signals 625 from multiple harmonic compensators and multiplies the resulting sum by an additional gain factor to generate compensation signal 515. In some servo systems, to maintain stability of the servo system, gain adjustment unit 524 uses a gain factor that is less than the gain factor for servo compensator 510. With a lower gain factor, cancellation of the periodic components of PES 505 may require multiple changes in factors 653 and 654 as described below.

After a revolution during which the servo system is allowed to settle, sums 651 and 652 are reset to zero, and analyzer 610 resumes accumulation of sine and cosine products. After X analysis revolutions, sums 651 and 652 should be smaller than the calculated values in the preceding analysis revolutions for the track because compensation generator 620 is now generating a compensation signal that cancels all or part of the associated harmonic from PES 505. Sums 651 and 652 are negative if the compensation signal overcompensated for periodic track variation. Based on the new sums 651 and 652, factors 653 and 654 in memory 250 are adjusted (increased or decreased) according to the averaged values. As the revolution after the second set of analysis revolutions begins, analyzer 610 again stops accumulating sums 651 and 652 and allows the system to settle while compensation generator 620 generates a correction signal 625 using updated factors 653 and 654. Thus, factors 653 and 654 are periodically updated and converge to values that cancel variations in track radius so that future sums are zero. The speed of convergence depends on the total gain factor, GF and the gain factor used by gain adjustment unit 530. A small total gain factor may require several updates of factors 653 and 654 before correction signal 625 completely compensates for track radius variation at the frequency associated with harmonic compensator 600. However, harmonic compensator 600 reduces the necessary compensation required of other systems, such as servo compensator 510, immediately after the first analysis revolutions. If the total gain factor is too large, factors 653 and 654 exhibit oscillatory behavior and if much too large, do not converge to the desired value. In particular disk system, the gain factor can be tuned to provide a sufficiently rapid convergence. After a seek to a new track, compensation generator 620 continues generating the correction signal using values for the previously analyzed track during the initial analysis revolutions for the new track. Since track distortions are likely similar for tracks on the same disk, factors 653 and 654 should quickly converge to the appropriate values to cancel periodic fluctuations in track radius.

Although, in the exemplary embodiment analyzer 610 is not used during a revolution after setting or changing factors 653 and 654, it is important to wait for the servo system to settle before further adjusting factors 653 and 654, and more than one settling revolution may be required during which analyzer 610 is inactive. After the settling revolution or revolutions, analyzer 610 accumulates sums 651 and 652 for X analysis revolutions. The sequence of (i) generating a compensation signal and simultaneously analyzing the track radius for a predetermined number of revolutions, (ii) updating the required factors, and (iii) generating a compensation signal without analyzing the track radius for a revolution to allow the servo system to settle is repeated continuously. Thus, factors 653 and 654 are summations over time. Such summations tend to smooth the response of a system and ameliorate problems associated with short transients. Also, the accumulation of factors over time prevents discontinuities and assures that data head 220 is maintained over the track centerline.

In the steady state, compensation signal 625 largely eliminates the corresponding harmonic in PES 505 so that subsequent analysis of PES 505 yields small corrections to the previous generated factors 653 and 654. Accordingly, in the steady state, the actuator positing signal causes the data head to follow the periodic radial variations δR of the track and has harmonics corresponding to multiple harmonics in the Fourier expansion of the radial variations δR. If during operation of the disk drive the disk is jarred or thermally cycled in a manner that changes the track distortion or runout, the steady state is disturbed, and analyzer 610 may provide larger corrections to update factors 653 and 654 and correct for the new track distortion or runout. Harmonic compensator 500 thus provides an adaptive real-time compensation signal so that data is not overwritten as a consequence of disk slippage or track distortion during operation.

The above embodiments only illustrate the principles of this invention are not intended to limit the invention to the particular embodiments described. For example, the adaptive compensation method of this invention may be used in a read only system or in a system that uses other than a magnetic medium. Further, many methods for analyzing the spectral content of signals are known and can be used in embodiments of the invention. Embodiments of the invention are thus not limited to spectral decomposition using Fourier transforms and may use expansions in terms of periodic functions other that sinusoidal function. These and various other adaptations and combinations of features of the embodiments disclosed are within the scope of the invention as defined by the following claims.

We claim:

1. A method for keeping a data head aligned with a track on a disk while the disk rotates about a rotation axis, comprising:

analyzing the spectral content of radial variation of the track to determine magnitudes of a plurality of components in an expansion of the radial variation;

generating a plurality of periodic signals having different frequencies that are multiples of a rotation frequency of the disk, each periodic signal having a magnitude equal to a magnitude determined for an associated one of the plurality of components; and generating a positioning signal for an actuator from the plurality of periodic signals, wherein the positioning signal controls the radial position of the data head relative to the rotation axis.

2. The method of claim 1, wherein analyzing comprises analyzing the harmonic content of a position error signal to determine the components in the expansion of the radial variation.

3. The method of claim 2, wherein:

analyzing further comprises:

analyzing the harmonic content of the position error signal to determine a first set of values indicating components of an expansion of the position error signal during a first set of analysis revolutions of the disk; and analyzing the harmonic content of the position error signal to determine a second set of values indicating components of the position error signal during a second set of analysis revolutions of the disk, the second set of analysis revolutions being after the first set, wherein during the second set of analysis revolutions, generating the positioning signal and the plurality of periodic signals is performed using the first set of values as the magnitudes of the periodic signals.

4. The method of claim 3, wherein the first set of analysis revolutions is separate from the second set of analysis revolutions by one or more revolutions during which analyzing of the position error signal is disabled and generating the plurality of periodic signals is performed using the first set of values as the magnitudes of the components of the radial variation.

5. The method of claim 3, wherein:

analyzing the spectral content of the radial variation further comprises:

adding each of the first set of values to an associated one of the second set of values to generate a set of combined values; and analyzing the harmonic content of the position error signal to determine a third set of values indicating components of the position error signal during a third set of analysis revolutions of the disk, the third set of analysis revolutions following the second sets of analysis revolutions; and generating the positioning signal and the plurality of periodic signals is performed during the third set of analysis revolutions using the combined set of values as the magnitudes of the periodic signals.

6. The method of claim 5, wherein:

the first set of analysis revolutions is separate from the second set of analysis revolutions by one or more revolutions during which analyzing of the position error signal is disabled and generating the plurality of periodic signals is performed using the first set of values as the magnitudes of the components of the radial variation; and the second set of analysis revolutions is separate from the third set of analysis revolutions by one or more revolutions during which analyzing of the position error signal is disabled and generating the plurality of periodic signals is performed using the set of combined values as the magnitudes of the components of the radial variation.

7. The method of claim 5, wherein:

analyzing the spectral content of the radial variation further comprises:

adding together associated values in previously determined sets of values indicating components of the position error signal during preceding sets of analysis revolutions to generate the set of combined values; and during a next set of analysis revolutions of the disk, analyzing the harmonic content of the position error signal to determine a next set of values indicating components of the position error signal; and during each set of analysis revolutions, generating the positioning signal and the plurality of periodic signals is performed using the combined set of values from the preceding sets of analysis revolutions as the magnitudes of the periodic signals.

8. The method of claim 7, further comprising continuously repeating the steps in claim 7 while following the track.

9. The method of claim 1, wherein the plurality of components in the expansion of the radial variation consists of a first component and a second component.

10. The method of claim 1, wherein the plurality of components in the expansion of the radial variation consists of a first component, a second component, and a third component.

11. A servo system comprising:

an actuator that in response to a position signal, radially positions a data head relative to a rotation axis of a disk;

means for analyzing harmonic content of a radial variation of a track around the rotation axis and generating a first signal indicating a first magnitude of a first spectral component of the radial variation and a second magnitude of a second spectral component of the radial variation;

first generation means for generating a first periodic signal having a frequency corresponding to the first spectral component and a magnitude equal to the first magnitude;

second generation means for generating a second periodic signal having a frequency corresponding to the second spectral component and a magnitude equal to the second magnitude; and means for combining the first and second periodic signals to generate the position signal for the actuator.

12. The system of claim 11, further comprising a servo compensator that generates a correction signal in response to a position error signal indicating a position of the data head relative to the track, wherein the means for combining scales and sums the correction signal and the first and second periodic signals in generating the position signal for the actuator.

13. The system of claim 12, wherein the means for analyzing analyzes the position error signal to determine the spectral content of the radial variation.

14. The system of claim 11, wherein the frequency of the first spectral component is equal to a rotation frequency of the disk.

15. The system of claim 14, wherein the frequency of the second spectral component is equal to twice the rotation frequency of the disk.

16. The system of claim 11, wherein:

the means for analyzing the harmonic content of the radial variation of the track generates a third signal indicating a magnitude for a third spectral component of the radial variation;

the system further comprises a third generation means for generating a third periodic signal having a frequency corresponding to the third spectral component and a magnitude equal to the magnitude of the third spectral component; and the means for combining sums the first, second, and third periodic signals in generating the position signal for the actuator.

17. A servo system comprising:

an actuator that in response to a position signal, radially positions a data head relative to a rotation axis of a disk;

an analyzer that analyzes a position error signal to determine harmonic content of a radial variation of a track around the rotation axis, the position error signal indicating a position of the data head relative to the track on the disk, wherein the analyzer generates a first signal indicating a magnitude of a first spectral component of the position error signal and a second signal indicating a magnitude of a second spectral component of the position error signal;

a first compensation generator responsive to the first signal, the first compensation generator generating a first periodic signal having a frequency corresponding to the first spectral component and the magnitude indicated by the first signal;

a second compensation generator responsive to the second signal, second compensation generator generating a second periodic signal having a frequency corresponding to the second spectral component and the magnitude indicated by the second signal; and a gain adjustment unit that combines the first and second periodic signals in generating a component of the position signal for the actuator.

* * * * *